(12) United States Patent
Oguni et al.

(10) Patent No.: US 7,744,979 B2
(45) Date of Patent: Jun. 29, 2010

(54) COMPOSITIONS FOR PROTECTIVE FILMS FOR OPTICAL DISCS

(75) Inventors: Kiichiro Oguni, Kanuma (JP); Satoshi Yanagida, Kanuma (JP); Kozaburo Hayashi, Kanuma (JP)

(73) Assignees: Sony Corporation, Tokyo (JP); Sony Chemical & Information Device Corporation, Tokyo (JP)

( * ) Notice: Subject to any disclaimer, the term of this patent is extended or adjusted under 35 U.S.C. 154(b) by 0 days.

(21) Appl. No.: 11/405,438

(22) Filed: Apr. 18, 2006

(65) Prior Publication Data

US 2006/0228516 A1 Oct. 12, 2006

Related U.S. Application Data

(63) Continuation of application No. PCT/JP2004/015356, filed on Oct. 18, 2004.

(30) Foreign Application Priority Data

Oct. 20, 2003 (JP) ............................. 2003-358772

(51) Int. Cl.
*B32B 3/02* (2006.01)
(52) U.S. Cl. ................. 428/64.1; 428/64.4; 430/270.11
(58) Field of Classification Search ....................... None
See application file for complete search history.

(56) References Cited

U.S. PATENT DOCUMENTS

| 5,271,988 | A | * | 12/1993 | Ikemoto et al. | ............ 428/195.1 |
| 5,318,850 | A | * | 6/1994 | Pickett et al. | ............... 428/412 |
| 5,573,831 | A | * | 11/1996 | Suzuki et al. | .............. 428/64.1 |
| 6,844,374 | B2 | * | 1/2005 | Jin et al. | ........................ 522/79 |
| 7,074,472 | B2 | * | 7/2006 | Itoh et al. | ................... 428/64.1 |
| 7,132,460 | B2 | * | 11/2006 | Fujimoto et al. | ............... 522/14 |
| 2002/0161135 | A1 | | 10/2002 | Berg et al. | |

FOREIGN PATENT DOCUMENTS

| JP | 63-150355 | * | 6/1988 |
| JP | A 04-247337 | | 9/1992 |
| JP | A 06-080902 | | 3/1994 |
| JP | A 08-279179 | | 10/1996 |
| JP | A 2004-217879 | | 8/2004 |

* cited by examiner

*Primary Examiner*—Elizabeth Mulvaney
(74) *Attorney, Agent, or Firm*—Oliff & Berridge, PLC

(57) ABSTRACT

Compositions for protective films include inorganic microparticles dispersed in an acrylic radical-based binder resin. Binder resins are formed from binder monomers including base components, scratch-resistant components and diluent components. Diluent components include diluent monomers having principal chain structures including a functional group having a cyclic structure or a branched carbon chain structure.

5 Claims, 1 Drawing Sheet

1

COMPOSITIONS FOR PROTECTIVE FILMS FOR OPTICAL DISCS

CROSS-REFERENCE TO RELATED APPLICATIONS

This application claims priority benefit of Japanese Application No. 2003-358772, filed on Oct. 20, 2003, the entire disclosure of which is incorporated herein by reference.

This application is a continuation of International Application No. PCT/JP2004/015356, filed Oct. 20, 2004, the entire disclosure of which is incorporated herein by reference.

BACKGROUND

The present invention relates to resin compositions for protective films, particularly, resin compositions for protective films for optical discs such as compact discs (CDs) and digital versatile discs (DVDs).

In these types of optical discs, the surfaces of exterior elements are normally coated to protect the surfaces of the exterior elements against scratches.

Effective materials for such coating are inorganic materials having high scratch resistance, but the inorganic materials have the disadvantage that coating solutions thereof are difficult to apply in a small thickness because of high viscosities.

In order to solve this problem, a conventional approach is to lower the viscosity of coating solutions by diluting solvents, but the diluted solutions erode substrates causing various problems.

For example, the substrate components are eluted, causing coating layers to lose flatness and therefore lose transparency (begin to appear matte).

Also, the eluted substrate components dissolve with the coating materials, so that scratch resistance is lowered.

Another possible approach to the above problem is to prepare a low viscosity coating solution using a low viscosity acrylate monomer as a reactive diluent in place of a solvent. When using this approach, however, scratch resistance may be considerably lowered depending on the monomer selected.

SUMMARY

The present invention was made to solve such problems of the conventional techniques with the aim of providing a composition for protective films for optical discs having a low viscosity and a low risk of substrate erosion without a reduction of scratch resistance.

As a result of careful studies to achieve the above object, the present invention was achieved on the basis of the finding that the viscosity of compositions for protective films for optical discs can be lowered without reduction of scratch resistance by using a monomer having a cyclic structure, but not a branched carbon chain structure, in the principal chain structure as a diluent component in the binder resin.

Embodiments of the present invention, prepared on the basis of the above findings, include compositions for protective films comprising inorganic microparticles dispersed in acrylic radical-based binder resins, wherein materials used for the binder resins include binder monomers comprising base components, scratch-resistant components and diluent components, the diluent components including monomers having functional groups having a cyclic structure, but not a branched carbon chain structure, in their principal chain structures.

Embodiments of the present invention include compositions for protective films for optical discs wherein a diluent component has a monofunctional or bifunctional group.

Embodiments of the present invention include compositions for protective films for optical discs wherein a diluent component has a viscosity of 10 mPa·s or more.

Embodiments of the present invention include compositions for protective films for optical discs wherein a diluent component has a viscosity of less than 50 mPa·s.

Embodiments of the present invention include compositions for protective films for optical discs wherein a diluent component has a viscosity of less than 20 mPa·s.

Embodiments of the present invention include compositions for protective films for optical discs where a diluent component has a viscosity lower than a viscosity of a composition for protective films for optical discs.

In embodiments of the present invention, compositions for protective films for optical discs have viscosities of 20 mPa·s or more and less than 100 mPa·s.

Embodiments of the present invention include protective films for optical discs obtained by curing compositions for protective films for optical discs such as described above.

Embodiments of the present invention include optical discs having recording patterns on substrates, and further comprising protective films for the optical discs provided on surfaces of readout sides of the substrates, wherein the protective films are obtained by curing compositions for protective films for optical discs comprising inorganic microparticles dispersed in acrylic radical-based binder resins, wherein materials used for the binder resins include binder monomers comprising base components, scratch-resistant components and diluent components, the diluent components including monomers having functional groups having a cyclic structure, but not a branched carbon chain structure, in their principal chain structures.

In embodiments of the present invention, viscosities of the compositions for protective films can be lowered without reduction of scratch resistance because a skeletal structure of a cured resin becomes rigid by using a monomer having a functional group having a cyclic structure, but not a branched carbon chain structure, in its principal chain structure as a diluent component in a binder monomer.

In embodiments of the present invention, viscosities of compositions for protective films for optical discs can be lowered without reduction of scratch resistance.

These and other optional features and possible advantages of various aspects of this invention are described in, or are apparent from, the following detailed description of exemplary embodiments of the present invention.

BRIEF DESCRIPTION OF THE DRAWINGS

Various exemplary embodiments of the invention will be described in detail with reference to the following figure, wherein.

DETAILED DESCRIPTION OF EMBODIMENTS

Figure 1:
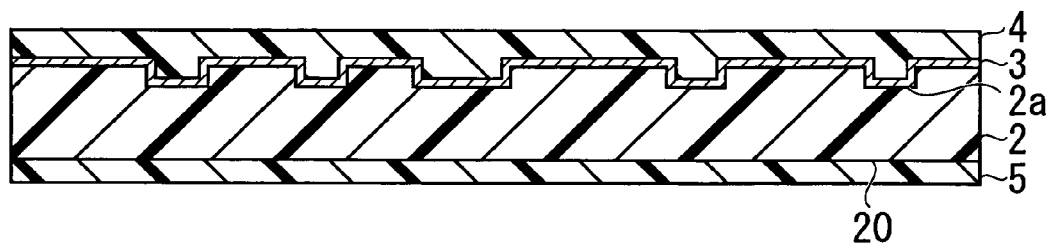
FIG. 1 is a schematic diagram showing an optical disc to which an exemplary composition for protective films for optical discs of the present invention has been applied.

Compositions for protective films (for optical discs) of the present invention comprise inorganic microparticles dispersed in an acrylic radical-based binder resin.

In embodiments of the present invention, the material used for the binder resin is a binder monomer comprising a base component, a scratch-resistant component and a diluent component.

Suitable base components include various monomers, preferably having a viscosity as low as possible (less than 100 mPa·s) to improve processability in dispersion (workability in dispersion) of inorganic microparticles.

Such monomers include, for example, trimethylolpropane triacrylate (TMPTA), 1,6-hexanediol diacrylate, caprolactone-modified dipentaerythritol hexaacrylate (2), neopentylglycol diacrylate, etc.

Suitable scratch-resistant components include various monomers, preferably having an acrylic functionality of 3 or more to improve scratch resistance.

Such monomers include tris (acryloxyethyl) isocyanurate, dipentaerythritol penta- and hexa-acrylate, ditrimethylolpropane tetraacrylate (DTMPTA), pentaerythritol tetraacrylate, etc.

Diluent components used in the present invention are monomers having a functional group of a cyclic structure but not having a functional group of a branched carbon chain structure in the principal chain structure.

The cyclic structure in the principal chain structure includes, for example, aromatic rings such as benzene rings as well as alicyclic structures such as cycloalkanes.

In embodiments of the present invention, the diluent component may have either monofunctional or bifunctional group.

Monomers having a functional group of a cyclic structure among diluent components of the present invention that can be used include, for example, dicyclopentenyl acrylate (DCPA: monofunctional), acryloyl morpholine (ACMO: monofunctional), etc.

In embodiments of the present invention, the viscosity (as used herein refers to average viscosity) of the diluent component is not specifically limited, but is preferably lower than the viscosity of the compositions to improve coatability on the surfaces of optical disc substrates by lowering the viscosity of the compositions, and specifically, the viscosity is preferably 10 mPa·s or more and less than 50 mPa·s, more preferably 10 mPa·s or more and less than 20 mPa·s.

Compositions for protective films that are effective for erosion-susceptible substrates can be obtained when a diluent component is a monomer having a monofunctional group and the diluent component has a viscosity of 10 mPa·s or more.

In embodiments of the present invention, the ratio of the base component, scratch-resistant component and diluent component in the binder monomer is not specifically limited, but preferably 70:5:25 to 60:20:20 to confer necessary and sufficient scratch resistance on scratch-resistant coatings for optical discs.

Exemplary compositions for protective films for optical discs of the present invention preferably have a viscosity of 20 mPa·s or more and less than 100 mPa·s to improve coatability on the surfaces of optical disc substrates.

In embodiments of the present invention, suitable inorganic microparticles include, for example, various inorganic microparticles such as colloidal silica ($SiO_2$) and colloidal alumina ($Al_2O_3$).

Inorganic microparticles preferably have a particle diameter of, but not specifically limited to, 10-30 nm to improve dispersibility and optical transmission.

Amounts of the inorganic microparticles are not specifically limited, but are preferably 15-30% by weight to confer scratch resistance.

In addition to photopolymerization initiators, exemplary compositions for protective films for optical discs of the present invention can comprise other components such as UV absorbents, surface tension modifiers, etc.

FIG. 1 is a schematic diagram showing an optical disc to which an exemplary composition for protective films for optical discs of the present invention has been applied.

As shown in FIG. 1, an optical disc 1 has a conventional structure, including a recording pattern 2a, a reflective film 3 and a protective film 4 formed on a disc-shaped substrate 2 made from a polycarbonate.

In embodiments of the present invention, a protective film 5, obtained by curing a composition for protective films for optical discs as described above, is provided on a readout side 20 of substrate 2.

In embodiments the present invention, the thickness of the protective film 5 is not specifically limited, but is preferably 1-5 μm to ensure scratch resistance and optical transmission.

Embodiments of the present invention can be employed as compositions, not only for protective films for optical discs, but also for various other protective films. However, the compositions described above are demonstrably effective when employed as compositions for protective films for optical discs.

EXAMPLES

Examples of the present invention are explained in detail below along with Comparative Examples.

Example 1

15 parts by weight of colloidal silica (sold under the name "NanoTek" from C.I. Kasei Co., Ltd.) are dispersed in a base component comprising a mixed solution of 25 parts by weight of trimethylolpropane triacrylate (sold under the name "TMPTA-N" from Daicel UCB Co., Ltd.), 15 parts by weight of 1,6-hexanediol diacrylate (sold under the name "HDODA" from Daicel UCB Co., Ltd.), 15 parts by weight of neopentylglycol diacrylate (sold under the name "Kayarad NPGDA" from Nippon Kayaku Co., Ltd.) and 5 parts by weight of caprolactone-modified dipentaerythritol hexaacrylate (2) (sold under the name "Kayarad DPCA-30" from Nippon Kayaku Co., Ltd.).

To this dispersion, 5 parts by weight of any of tris (acryloxyethyl) isocyanurate (sold under the name "SR-368" from Kayaku Sartomer Co., Ltd.), dipentaerythritol penta- and hexa-acrylate (sold under the name "Aronix M-400" from Toagosei Co., Ltd.), ditrimethylolpropane tetraacrylate (sold under the name "SR-355" from Kayaku Sartomer Co., Ltd.) or pentaerythritol tetraacrylate (sold under the name "SR-295" from Kayaku Sartomer Co., Ltd.) are added as a scratch-resistant component, and 20 parts by weight dicyclopentenyl acrylate (DCPA, available from BASF; viscosity: 10 mPa·s) are added as a diluent component.

Further, 5 parts by weight each of Irgacure 184 and Darocur 1173 (both from Ciba Specialty Chemicals K. K.) are added as photoinitiators.

The average viscosity of the prepared coating solution is determined using a cone and plate viscometer. The results are shown in Table 1.

The coating solution is applied on a low molecular weight polycarbonate substrate formed by injection molding and a high molecular weight polycarbonate substrate formed by casting in a thickness of 15 μm after drying.

The coating film is irradiated with UV rays at an integrated dose of 300 mJ/cm using a metal halide lamp (120 W/cm).

The cured coating film is evaluated for scratch resistance. The results are shown in Table 2.

A Taber Abrasion Tester (abrading wheel CS-10F, load 250 g, 100 revolutions) is used to evaluate samples having a Δ haze value of less than 10% after testing as "○" and samples having a Δ haze value of 10% or more after testing as "×".

Example 2

A coating film is formed and evaluated for scratch resistance by the same procedures as in Example 1 except that 20 parts by weight of acryloyl morpholine (ACMO from KOHJIN Co., Ltd.; viscosity: 12 mPa·s) are added as a diluent component. The results are shown in Tables 1 and 2.

Comparative Example 1

A coating film is formed and evaluated for scratch resistance by the same procedures as in Example 1 except that 20 parts by weight of tripropyleneglycol diacrylate (TRPGDA from Daicel UCB Co., Ltd.; viscosity: 8 mPa·s) are added as a diluent component. The results are shown in Tables 1 and 2.

Comparative Example 2

A coating film is formed and evaluated for scratch resistance by the same procedures as in Example 1 except that 20 parts by weight of 1,4-butanediol diacrylate (Laromer BDDA from BASF; viscosity: 5 mPa·s) are added as a diluent component. The results are shown in Tables 1 and 2.

Comparative Example 3

A coating film is formed and evaluated for scratch resistance by the same procedures as in Example 1 except that 20 parts by weight of isobornyl acrylate (IBOA from Daicel UCB Co., Ltd.; viscosity: 4 mPa·s) are added as a diluent component. The results are shown in Tables 1 and 2.

TABLE 1

Viscosity (mPa · s) of blend compositions (coating solution)

| | Diluent component | Scratch-resistant component | | | |
|---|---|---|---|---|---|
| | | SR368 | M400 | SR355 | SR295 |
| Example 1 | DCPA | 37 | 37 | 34 | 34 |
| Comparative example 1 | TRPGDA | 42 | 40 | 38 | 38 |
| Comparative example 2 | BDDA | 21 | 22 | 20 | 19 |
| Example 2 | ACMO | 44 | 43 | 45 | 39 |
| Comparative example 3 | IBOA | 36 | 35 | 33 | 32 |

[Evaluation Results]

As shown in Table 1, the viscosities of the coating solutions of Example 1 and Example 2 are less than 50 mPa·s. The coating films after curing show good scratch resistance without causing erosion by monomers on both low molecular polycarbonate and high molecular polycarbonate.

However, the low molecular weight polycarbonate substrate is eroded by monomers in the coating films of Comparative Example 1 and Comparative Example 2. Comparative Example 1 uses a binder monomer comprising a diluent component having no functional group of a cyclic structure, but having a branched carbon chain structure, in the principal chain structure. Comparative Example 2 uses a binder monomer comprising a diluent component having a functional group of a cyclic structure and a branched carbon chain structure in the principal chain structure.

The coating film of Comparative Example 3 using a binder monomer comprising a diluent component having functional groups of both cyclic structure and branched carbon chain structure in the principal chain structure shows low scratch resistance on the low molecular polycarbonate substrate.

As described above, the present invention provides resin compositions for protective films that are useful as protective films for optical discs such as compact discs (CDs) and digital versatile discs (DVDs), for example.

While this invention has been described in conjunction with the exemplary embodiments outlined above, various alternatives, modifications, variations, improvements and/or substantial equivalents, whether known or that are or may be presently unforeseen, may become apparent to those having at least ordinary skill in the art. Accordingly, the exemplary embodiments of the invention, as set forth above, are intended to be illustrative, not limiting. Various changes may be made without departing from the spirit and scope of the invention. Therefore, the invention is intended to embrace all known or later developed alternatives, modifications, variations, improvements and/or substantial equivalents.

What is claimed is:

1. A composition for protective films for optical discs comprising inorganic microparticles dispersed in an acrylic radical-based binder resin, wherein:

TABLE 2

Evaluation results of Examples and Comparative examples

| | | Principal chain structure | | Viscosity of the diluent component (mPa · s) | Func- tionality | Scratch resistance test result | | | | | | | |
|---|---|---|---|---|---|---|---|---|---|---|---|---|---|
| | Diluent component | Cyclic structure | Branched carbon chain structure | | | Low molecular weight PC scratch-resistant component | | | | High molecular weight PC scratch-resistant component | | | |
| | | | | | | SR368 | M400 | SR355 | SR295 | SR368 | M400 | SR355 | SR295 |
| Example 1 | DCPA | Yes | No | 10 | 1 | ○ | ○ | ○ | ○ | ○ | ○ | ○ | ○ |
| Comparative example 1 | TRPGDA | No | Yes | 8 | 2 | Erosion | Erosion | Erosion | Erosion | ○ | ○ | ○ | ○ |
| Comparative example 2 | BDDA | No | No | 5 | 2 | Erosion | Erosion | Erosion | Erosion | ○ | ○ | ○ | ○ |
| Example 2 | ACMO | Yes | No | 12 | 1 | ○ | ○ | ○ | ○ | ○ | ○ | ○ | ○ |
| Comparative example 3 | IBOA | Yes | Yes | 4 | 1 | X | X | X | X | ○ | ○ | ○ | ○ |

○: Δ haze value of less than 10%
X: Δ haze value of 10% or more the binder resin is formed from a binder monomer comprising a base component, a scratch-resistant component and a diluent component, wherein:

the base component is a monomer having a viscosity of less than 100 mPa·s;

the scratch-resistant component is a monomer having an acrylic functionality of three or more, wherein the scratch-resistant component monomer is selected from the group consisting of tris (acryloxyethyl) isocyanurate, dipentaerythritol penta- and hexa-acrylate, ditrimethylolpropane tetraacrylate, and pentaerythritol tetraacrylate; and the diluent component comprises a diluent monomer, a principal chain structure of the diluent monomer comprising a functional group having a cyclic structure, the diluent component having a viscosity of 10 mPa·s or more and 50 mPa·s or less; and a ratio of the base component, scratch-resistant component and diluent component in the binder monomer is from 70:5:25 to 60:20:20, and wherein the composition for protective films for optical discs has a viscosity of 20 mPa·s or more and less than 100 mPa·s.

2. The composition according to claim 1, wherein the diluent component comprises a monofunctional or bifunctional group.

3. The composition according to claim 1, wherein a viscosity of the diluent component is less than a viscosity of the composition.

4. A protective film for optical discs, comprising a film obtained by curing a composition comprising inorganic microparticles dispersed in an acrylic radical-based binder resin formed from a binder monomer comprising a base component, a scratch-resistant component and a diluent component, wherein:

the base component is a monomer having a viscosity of less than 100 mPa·s;

the scratch-resistant component is a monomer having an acrylic functionality of three or more, wherein the scratch-resistant component monomer is selected from the group consisting of tris (acryloxyethyl)isocyanurate, dipentaerythritol penta- and hexa-acrylate, ditrimethylolpropane tetraacrylate, and pentaerythritol tetraacrylate;

the diluent component comprises a diluent monomer, a principal chain structure of the diluent monomer comprising a functional group having a cyclic structure, but not a branched carbon chain structure, the diluent component having a viscosity of 10 mPa·s or more and 50 mPa·s or less; and a ratio of the base component, scratch-resistant component and diluent component in the binder monomer is from 70:5:25 to 60:20:20, and wherein the composition has a viscosity of 20 mPa·s or more and less than 100 mPa·s.

5. An optical disc, comprising:

a substrate having a recording pattern; and a protective film formed on a surface of a readout side of the substrate; wherein:

the protective film is obtained by curing a composition comprising inorganic microparticles dispersed in an acrylic radical-based binder resin;

the binder resin is formed from a binder monomer comprising a base component, a scratch-resistant component and a diluent wherein:

the base component is a monomer having a viscosity of less than 100 mPa·s;

the scratch-resistant component is a monomer having an acrylic functionality of three or more, wherein the scratch-resistant component monomer is selected from the group consisting of tris (acryloxyethyl) isocyanurate, dipentaerythritol penta and hexa-acrylate, ditrimethylolpropane tetraacrylate, and pentaerythritol tetraacrylate; and the diluent component comprises a monomer having a principal chain structure comprising a functional group having a cyclic structure, the diluent component having a viscosity of 10 mPa·s or more and 50 mPa·s or less;

a ratio of the base component, scratch-resistant component and diluent component in the binder monomer is from 70:5:25 to 60:20:20, and wherein the composition comprising inorganic microparticles dispersed in an acrylic radical-based binder resin has a viscosity of 20 mPa·s or more and less than 100 mPa's.

* * * * *